United States Patent [19]

Shirako

[11] 4,410,087
[45] Oct. 18, 1983

[54] TAPE CASSETTE STORAGE BOX

[75] Inventor: Hideo Shirako, Hachioji, Japan

[73] Assignee: Olympus Optical Co., Ltd., Tokyo, Japan

[21] Appl. No.: 344,357

[22] Filed: Feb. 1, 1982

[30] Foreign Application Priority Data

Feb. 7, 1981 [JP] Japan .............................. 56-16134[U]

[51] Int. Cl.³ .......................................... B65D 85/672
[52] U.S. Cl. ..................................... 206/387; 206/480
[58] Field of Search ................ 206/387, 480; 220/334, 220/335, 342, 343; 312/12, 20, 111

[56] References Cited

U.S. PATENT DOCUMENTS

| D. 224,177 | 7/1972 | Wallace | 206/387 |
|---|---|---|---|
| 3,272,325 | 9/1966 | Schoenmakers et al. | 206/387 |
| 3,747,745 | 7/1973 | Esashi et al. | 206/387 |
| 3,754,639 | 8/1973 | Gellert | 206/387 |
| 3,763,994 | 10/1973 | Somers . | |
| 4,026,615 | 5/1977 | Tazaki et al. | 206/387 |

FOREIGN PATENT DOCUMENTS 49-26257  7/1974  Japan .
1440180   6/1976  United Kingdom ................ 206/387

Primary Examiner—Joseph Man-fu Moy
Attorney, Agent, or Firm—Frishauf, Holtz, Goodman and Woodward

[57] ABSTRACT

A tape cassette storage box comprises a main body which has a tape cassette detachable opening and an auxiliary opening, the detachable opening detachably holding a tape cassette one of the two flat surfaces of the cassette being exposed to the outer atmosphere, and the auxiliary opening exposing one of the four side surfaces of the cassette held in the body to the outer atmosphere; a cover which is rotatable between a first position where the cover covers the detachable opening and a second position where the cover is spaced apart from the detachable opening; and a tongue portion which moves together the cover, which covers the auxiliary opening and which faces the one side surface when the cover is located in the first position, and an end portion of which, being away from the cover, comes close to the one side surface when the cover is moved from the first position to the second position, wherein the tongue portion has an eject member which moves together with the tongue portion and is spaced apart from the cassette upon the movement of the cover to the first position and which makes a part, in the vicinity of the one side surface, of the one flat surface, move in the direction away from the detachable opening upon the movement of the cover from the first position to the second position.

8 Claims, 9 Drawing Figures

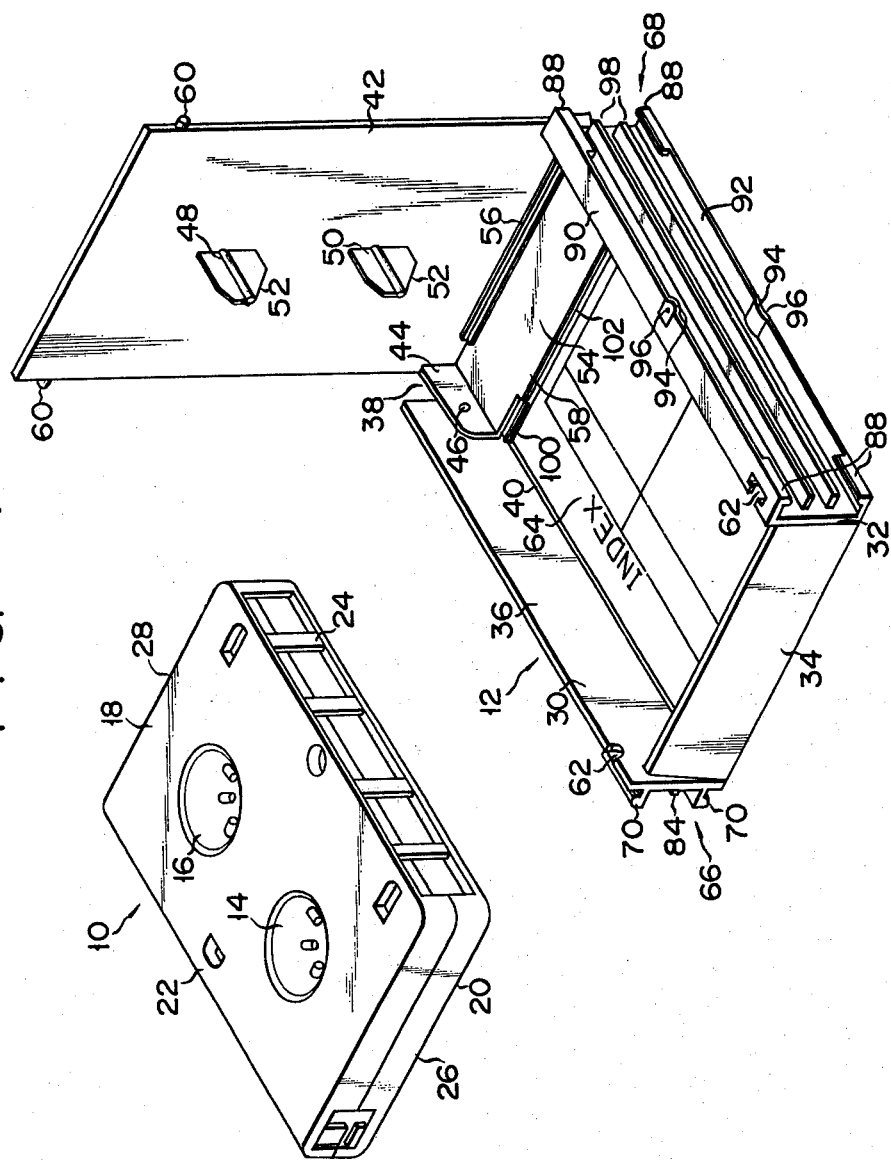

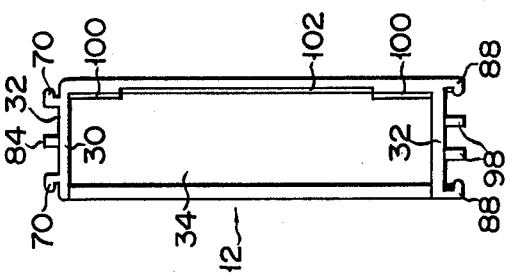
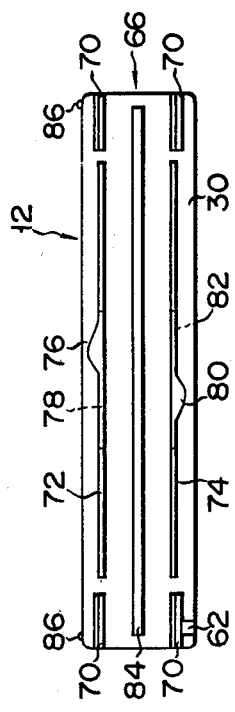
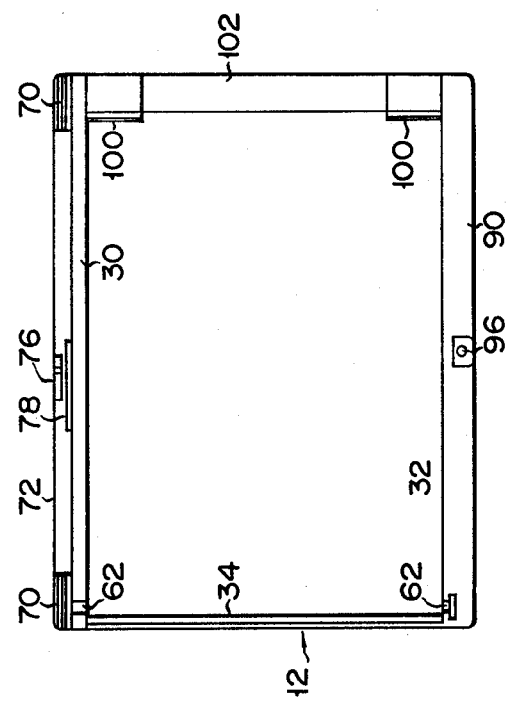

TAPE CASSETTE STORAGE BOX

BACKGROUND OF THE INVENTION

The present invention relates to a tape cassette storage box which stores a tape cassette.

A tape cassette storage box is known which comprises a main body which has a tape cassette detachable opening and an auxiliary opening, the tape cassette detachable opening detachably holding a tape cassette which has two surfaces mutually spaced apart parallel to each other and rotatably holding reel hub and four side surfaces connecting the two surfaces and continuing along rims of the two surfaces, one of the two surfaces being exposed to the outer atmosphere, and the auxiliary opening exposing one of the four side surfaces of the tape cassette held in the main body to the outer atmosphere; a cover which is rotatably mounted on the main body and is rotatable between a first position where the cover covers the tape cassette detachable opening and stores the tape cassette in the main body in cooperation therewith and a second position where the cover is spaced apart from the tape cassette detachable opening to allow mounting/demounting of the tape cassette in and from the main body through the tape cassette detachable opening; and a tongue portion which moves together with the cover, and which covers the auxiliary opening and faces said one of the four side surfaces of the tape cassette which is held in the main body when the cover is located in the first position, and an end portion of which, being away from the cover, comes close to said one of the four side surfaces of the tape cassette which is held in the main body when the cover is moved from the first position to the second position.

In some of the conventional tape cassette storage boxes of this type, a kangaroo pocket is formed at the tongue portion of the tape cassette storage box so as to facilitate mounting/demounting of the tape cassette in and from the main body.

In the conventional tape cassette storage box which has a kangaroo pocket at the tongue portion, the tape cassette must be slid along the inner surface of the cover for easy mounting or removal of the tape cassette in or from the main body. However, when the tape cassette storage box is placed on a flat surface, for example, on the top surface of a table, and when the tape cassette is mounted or demounted in or from the main body by one hand, the sliding operation as described above is difficult to accomplish. This difficulty increases when the size of the tape cassette is made small. For example, the difficulty increases when a microcassette is handled as compared with a compact cassette.

Another tape cassette storage box is proposed in Japanese Utility Model Publication No. 49-26,257.

A main body of this tape cassette storage box has another auxiliary opening which opposes the auxiliary opening as described above. Another side surface which is parallel to said one side surface of the four side surfaces of the tape cassette which is held in the main body is exposed to the outer atmosphere through this additional auxiliary opening. The main body of the tape cassette storage box has rotation preventing members which engage with the reel hubs so as to prevent the rotation of the reel hubs. These rotation preventing members have surfaces which gradually incline toward the cassette detachable opening when viewed from the one auxiliary opening to the other auxiliary opening. The cover has another tongue portion which closes the other auxiliary opening when the cover is located at the first position and which moves away from the tape cassette held in the main body when the cover is located at the second position.

In this conventional tape cassette storage box, when the cover moves from the first position to the second position, the tongue portion comes in contact with one of the four side surfaces of the tape cassette held in the main body. Therefore, the force toward the other auxiliary opening is applied to the tape cassette. The tape cassette which is urged by the tongue portion makes the reel hubs slide along the inclined surfaces of the rotation preventing members. In this manner, the tape cassette moves from the main body through the tape cassette detachable opening to the outer atmosphere.

This conventional tape cassette storage box has several drawbacks. The main cause of these drawbacks is that the reel hubs and the rotation preventing members are in slidable contact with each other when the tape cassette is mounted or demounted in or from the main body. In particular, when the frictional force between the reel hubs and the rotation preventing members is suddenly increased for some reason, a relatively large force is applied to the tongue portion, the cover, the pivotal axis of the cover, and the rotation preventing members, resulting in damage to the tongue portion, the cover, and the pivotal axis of the cover.

SUMMARY OF THE INVENTION

The present invention has been made in consideration of this and has as its object to provide a tape cassette storage box which allows easy mounting or demounting of a tape cassette in or from a main body regardless of the size of the tape cassette.

BRIEF DESCRIPTION OF THE DRAWINGS

FIG. 1 is a perspective view of a tape cassette storage box and a tape cassette which is stored in this tape cassette storage box, in which a cover is located at a second position, according to an embodiment of the present invention;

FIG. 2 is a left side view of the main body of the tape cassette storage box;

FIG. 3 is a plan view of the main body of the tape cassette storage box of FIG. 1;

FIG. 4 is a rear view of the main body of the tape cassette storage box of FIG. 1;

DETAILED DESCRIPTION OF THE PREFERRED EMBODIMENT

Figure 5:
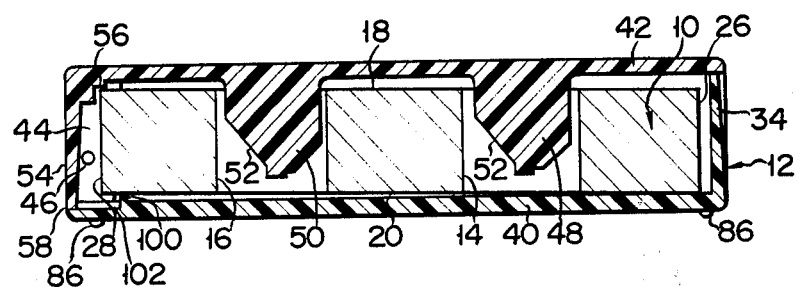
FIG. 5 is a longitudinal sectional view of the tape cassette storage box schematically illustrating the state in which the tape cassette is held in the main body of the tape cassette storage box when the cover is located in the first position.

A tape cassette storage box as shown in FIG. 1 according to an embodiment of the present invvention has a main body 12 which detachably holds a tape cassette 10. In this embodiment, the tape cassette 10 is a known tape cassette called a microcassette. The microcassette has two flat surfaces 18 and 20 which are mutually spaced apart parallel to each other and which rotatably hold reel hubs 14 and 16. The microcassette further has four side surfaces 22, 24, 26 and 28 which are continuously formed along the two flat surfaces 18 and 20.

The main body 12 has three side walls 30, 32 and 34 which detachably hold the tape cassette 10 and which respectively face three side surfaces among the four side surfaces 22, 24, 26 and 28 of the tape cassette 10; for example, in this embodiment, two relatively long side surfaces 22 and 24 which are substantially parallel to each other and one of the two relatively short side surfaces 26 and 28. The two side walls 30 and 32 among the three side walls 30, 32 and 34 are substantially parallel to each other and longer than the other side wall 34.

The main body 12 has a tape cassette detachable opening 36 through which the flat surface 18 of the two flat surfaces 18 and 20 of the tape cassette 10 is exposed to the outer atmosphere upon the three side surfaces of 22, 24 and 26 of the tape cassette 10 face the three side walls 30, 32 and 34. Further, the main body 12 has an auxiliary opening 38 through which the side surface 28 among the four side surfaces 22, 24, 26 and 28 of the tape cassette 10 is exposed to the outer atmosphere.

The main body 12 has a bottom wall 40 which opposes the other flat surface 20 of the flat surfaces 18 and 20 of the tape cassette 10 when the three side surfaces 22, 24 and 26 of the tape cassette, respectively, oppose the three side walls 30, 32 and 34.

The three side walls 30, 32 and 34 are formed integrally with the bottom wall 40. The tape cassette 10 is detachably held in the main body 12 when the three side walls 30, 32 and 34, respectively, oppose the three side surfaces 22, 24 and 26 of the four side surfaces 22, 24, 26 and 28 of the tape cassette 10 and the bottom wall 40 opposes the other flat surface of the two flat surfaces 18 and 20.

The tape cassette storage box of FIG. 1 according to the embodiment of the present invention has a cover 42 which is rotatably mounted to the main body 12. The area of the cover is substantially the same as that of the tape cassette detachable opening 36. A pair of projecting portions 44 are formed on the part of the cover 42 in the vicinity of an auxiliary opening 38 along the relatively long side walls 30 and 32 (to be referred to as first and second side walls hereinafter) of the main body 12. A known connecting means 46 is disposed for the pair of projecting portions so as to allow the cover 42 to freely rotate about the first and second side walls 30 and 32 of the main body 12. The known connecting means 46 may comprise a combination of a pin and a recess which receives the pin.

A pair of reel hub rotation preventing members 48 and 50 are disposed on the inner surface of the cover 42. Inclined surfaces 52 are formed on the pair of reel hub rotation preventing members 48 and 50 in the vicinities of the rotational centers of the cover 42.

A tongue portion 54 is formed on the cover 42 in the vicinity of the auxiliary opening 38. The tongue portion 54 has the substantially same area as the auxiliary opening 38. A rattle preventing rib 56 is disposed on the inner surface of the intersection of the tongue portion 54 and the cover 42.

An eject member 58 is disposed at one end of the tongue portion 54 which is away from the cover 42, as shown in FIG. 1.

Engaging projections 60 are disposed at positions, spaced apart from the tongue portion 54, of the two side walls of the cover 42 which are substantially parallel to the first and second side walls 30 and 32 of the main body 12. Engaging recesses 62 are formed on the upper surfaces of the first and second side walls 30 and 32 so as to engage with the pair of engaging projections 60 of the cover 42.

The third side wall 34 of the main body 12 is inclined with respect to the front ends of the first and second side walls 30 and 32, as shown in FIG. 1. The upper end of the third side wall 34 is closer to the rear ends of the first and second side walls 30 and 32 than to the upper front ends thereof.

An index sheet 64 is placed on the inner surface of the bottom wall 40 of the main body 12.

A first engaging means 66 is disposed on the outer surface of the first side wall 30 of the main body 12, as shown in FIG. 1. A second engaging means 68 is disposed on the outer surface of the second side wall 32 of the main body 12, as shown in FIG. 1.

Assume that two tape cassette storage boxes are prepared which, respectively, have the first and second engaging means 66 and 68. The first and second engaging means 66 and 68 of one tape cassette storage box are engaged with those of the other tape cassette storage box, connecting the two tape cassette storage boxes mutually. The first connecting means 66 has four engaging pawls 70 at four outer corners of the first side wall 30, as shown in FIG. 2. A first guide plate 72 is disposed between the two engaging pawls 70 which are formed at two upper corners of the first side wall 30. The two engaging pawls 70 at the upper corners and the first guide plate 72 are spaced apart. A second guide plate 74 is disposed between the two engaging pawls 70 which are formed at the lower corners of the first side wall 30. The second guide plate 74 and the two engaging pawls 70 at the lower corners of the first side wall 30 are spaced apart.

A first stopper 76 is disposed on the upper surface of the first guide plate 27 to be substantially at the center (transverse direction) of the first side wall 30, as shown in FIGS. 2 and 3. A slit 78 is formed at the part of the first guide plate 72 between the first stopper 76 and the outer surface of the first side wall 30, as shown in FIG. 2.

A second stopper 80 is formed on the lower surface of the second guide plate 74 to be substantially at the center of the first side wall 30. A slit 82 in the same manner as in the slit 78 is formed at the part of the second guide plate 74 between the second stopper 80 and the outer surface of the first side wall 30.

An auxiliary guide plate 84 substantially parallel to the first and second guide plates 72 and 74 is disposed between the first guide plate 72 and the second guide plate 74, as shown in FIG. 2.

A plurality of projections 86 are formed on the outer surface of the bottom wall 40 of the main body 12, as shown in FIGS. 2 and 4.

The second engaging means 68 has four engaging pawls 88 at the four corners on the outer surface of the second side wall 32, as shown in FIG. 1. A third guide plate 90 is disposed along the upper edge of the second side wall 32. The two engaging pawls 88 at the upper corners and the third guide plate 90 are mutually connected. A fourth guide plate 92 is disposed along the lower edge of the second side wall 32. The two engaging pawls 88 at the lower corners and the fourth guide plate 92 are mutually connected.

Abutment members 94 are formed on the parts of the lower surface of the third guide plate 90 and the upper surface of the fourth guide plate 92, which are substantially at the center of the second side wall 32. Recesses 96 are formed at positions, corresponding to the abutment members 94, on the upper surface of the third guide plate 90 and the lower surface of the fourth guide plate 92.

A pair of auxiliary guide plates 98 are disposed substantially at the center of the third and fourth guide plates 90 and 92 and on the outer surface of the second side wall 32 along the third and fourth guide plates 90 and 92. The pair of auxiliary guide plates 98 are spaced apart so as to be parallel.

As shown in FIGS. 1 and 3, a pair of ribs 100 which extend away from the inner surfaces of the first and second side walls 30 and 32 toward one another are formed on the inner surface of the bottom wall 40 of the main body 12 in the vicinity of the auxiliary opening 38. A recess 102 is formed between the pair of ribs 100.

The tape cassette 10 is mounted to the main body 12 through the tape cassette detachable opening 36. Thereafter, the cover 42 is pivoted from the position shown in FIG. 1 to the position shown in FIG. 5. The tape cassette detachable opening 36 is covered with the cover 42 as shown in FIG. 5. In this condition, the cover 42 faces the flat surface 18 of the tape cassette 10. The tape cassette 10 is held by the cover 42 in cooperation with the main body 12. The position of the cover 42 at this ime is defined as the first position of the cover 42.

When the cover 42 is located in the first position, the pair of reel hub rotation preventing members 48 and 50 engage with the pair of reel hubs 14 and 16 of the tape cassette 10, as shown in FIG. 5. Therefore, the rotation of the pair of reel hubs 14 and 16 is prevented. The tongue portion 54 covers the auxiliary opening 38, as shown in FIG. 5, and faces the side surface 28 among the four side surfaces 22, 24, 26 and 28 of the tape cassette 10. In this condition, the eject member 58 is fitted in the recess 102 of the main body 12.

The flat surface 20 is in contact with the ribs 100 in the vicinity of the side surface 28 of the tape cassette 10 stored in the main body. Further, a gap is defined between the flat surface 20 and the bottom surface of the recess 102.

When the cover 42 is pivoted from the first position to an upper position by means of the connecting means 46, one end of the tongue portion 54 which is away from the cover 42 comes close to the side surface 28 of the tape cassette 10. The eject member 58 which is located at the end of the tongue portion 54 comes in contact with the flat surface 20 of the tape cassette 10 in the vicinity of the side surface 28. When the cover 42 is further pivoted, the flat surface 18 of the tape cassette 10 is moved by the eject member 58 in the vicinity of the side surface 28 so as to eject the tape cassette 10. The cover 42 is spaced apart from the tape cassette detachable opening 36. Therefore, the tape cassette 10 which is mounted in the main body 12 can be ejected through the tape cassette detachable opening 36. The position of the cover 42 at this time is defined as the second position of the cover 42.

Figure 6:
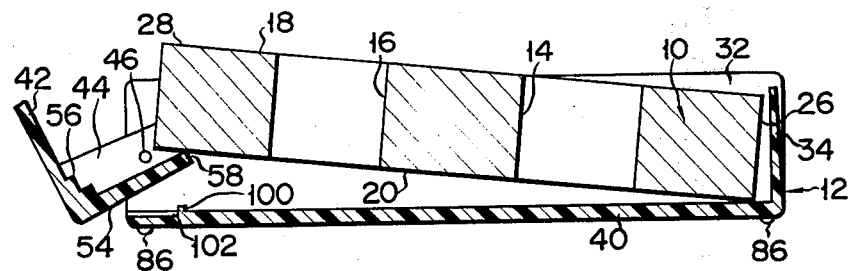
FIG. 6 is a longitudinal sectional view schematically showing the state in the same manner as in FIG. 5 after the cover is moved from the first position as shown in FIG. 5 to the second position.

When the cover 42 is moved from the first position shown in FIG. 5 to the second position shown in FIG. 6, one end of the tape cassette 10 is lifted from the inner surface of the bottom wall 40 of the main body 12 by the eject member 58. In this manner, the tape cassette 10 can be easily ejected through the tape cassette detachable opening 36.

When the tape cassette 10 is to be mounted in the main body 12 of the tape cassette storage box, the flat surface 20 of the tape cassette 10 is placed on the inner surface of the bottom wall 40 of the main body 12 in the vicinity of the side surface 26, as shown in FIG. 6. Further, the flat surface 20 is placed on the eject member 58 of the cover 42 which is located in the second position in the vicinity of the side surface 28. When the cover 42 is pivoted from the second position to the first position, the tape cassette 10 can be stored in the tape cassette storage box according to the procedure opposite in order to that for ejection as described above.

Figure 7:
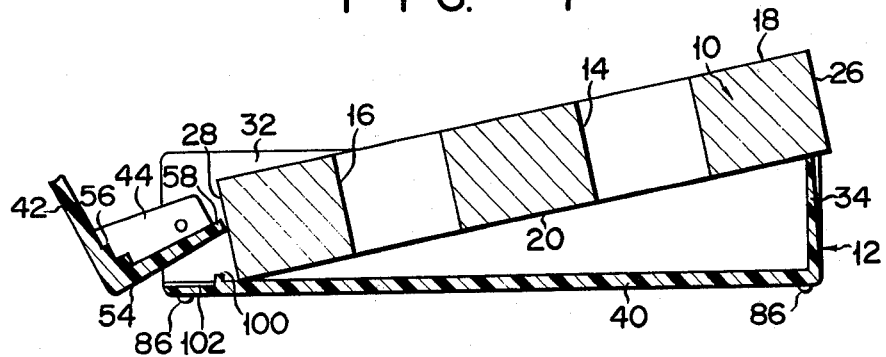
FIG. 7 is a longitudinal sectional view schematically showing the state in the same manner as in FIG. 5 by mounting the tape cassette with an irregular method in the main body through a tape cassette detachable opening of the main body of the tape cassette storage box.

Referring to FIG. 7, assume that the flat surface 20 of the tape cassette 10 is placed on the upper end of the third side wall 34 of the main body 12 in the vicinity of the side surface 26, and simultaneously, the side surface 28 of the tape cassette 10 comes in contact with the eject member 58 of the cover 42 located in the second position. In this condition, when the cover 42 is pivoted to the first position, the inclined surfaces 52 of the reel hub rotation preventing member 50 come in contact with the upper edge of the reel hub 16 of the tape cassette 10. The inclined surfaces 52 slide along the reel hub 16. When the inclined surfaces 52 of the reel hub rotation preventing member 50 slide along the reel hub 16, the tape cassette 10 is moved toward the auxiliary opening 38 of the main body 12. As shown in FIG. 5, the tape cassette is finally stored in the tape cassette storage box.

The projections 86 are formed to prevent contact of the upper surface of a table with the outer surface of the bottom wall 40 of the main body when the main body 12 is placed on the upper surface thereof, thus preventing scratches on the outer surface of the tape cassette storage box.

The auxiliary guide plate 84 of the first side wall 30 of the main body 12 and the pair of auxiliary guide plates 98 of the second side wall 32 are formed to align the seam of a packing film of the tape cassette storage box 10 with the outer surfaces of the first to third side walls 30, 32 and 34 and of the tongue portion 54.

The seam of the packing film is thus aligned with the outer surfaces to improve the outer appearance when the tape cassette storage box 10 is displayed at a shop, thus promoting the sale of the tape cassette storage boxes.

Figure 8:
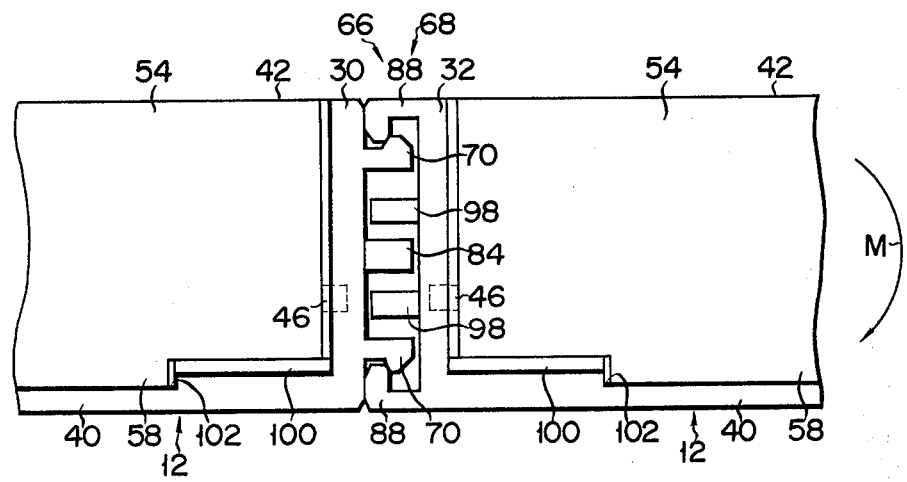
FIG. 8 is a rear view illustrating the state in which two tape cassette storage boxes of FIG. 1 are connected by first and second connecting means.

When the cover 42 is located in the first position, as shown in FIG. 8, the eject member 58 is in contact with the upper surface of the recess 102 of the main body 12. Therefore, when the two tape cassette storage boxes which are mutually connected by the first and second connecting means 66 and 68 as shown in FIG. 8 are disengaged, assume that the moment of force is applied to one of the tape cassette storage boxes in the direction shown by an arrow M. The distortion of the bottom wall 40 of the main body 12 is less than that of the case wherein the eject member 58 is not in contact with the upper surface of the recess 102 of the main body 12. The cover 42 and the main body 12 which are connected by the connecting means 46 are not erroneously disengaged.

According to this invention, there is provided a tape cassette storage box comprising a main body which has a tape cassette detachable opening and an auxiliary opening, the tape cassette detachable opening detachably holding a tape cassette which has two flat surfaces which are mutually spaced apart parallel to each other and rotatably holding reel hubs, and four side surfaces which connect the two flat surfaces and which continue along rims of the two flat surfaces, one of the two flat surfaces being exposed to the outer atmosphere, and the auxiliary opening exposing one of the four side surfaces of the tape cassette held in the main body to the outer atmosphere; a cover which is mounted on the main body, and is rotatable between a first position where the cover the tape cassette detachable opening and stores the tape cassette in the main body in cooperation therewith and a second position where the cover is spaced apart from the tape cassette detachable opening to allow mounting/demounting of the tape cassette in and from the main body through the tape cassette detachable opening; and a tongue portion which moves together the cover, which covers the auxiliary opening and which faces the one of the four side surfaces of the tape cassette which is held in the main body, when the cover is located in the first position, and an end portion of which, being away from the cover, comes close to the one of the four side surfaces of the tape caassette which is held in the main body when the cover is moved from the first position to the second position, wherein the tongue portion has an eject member which moves together with the tongue portion and is spaced apart from the tape cassette held in the main body upon the movement of the cover to the first position and which makes a part, in the vicinity of the one of the four side surfaces, of the one of the two flat surfaces of the tape cassette, move in the direction away from the tape cassette detachable opening upon the movement of the cover from the first position to the second position. With such arrangement, the tape cassette storage box allows easy mounting or demounting of a tape cassette in or from a main body regardless of the size of the tape cassette. Preferably, in the tape cassette storage box of the invention, the eject member is in contact with the other of the flat surfaces, in the vicinity of the one of the four side surfaces, of the tape cassette upon the movement of the cover from the first position to the second position.

With the above structure, the eject member is simple in construction.

The tape cassette storage box of the invention may be so constructed that the tongue portion faces one of relatively short side surfaces among the four side surfaces of the tape cassette when the cover is located in the first position. Preferably, in the tape cassette storage box of this invention which has the above stated construction, the main body has two side walls which oppose the relatively long side surfaces among the four side surfaces of the tape cassette held in the main box, first engaging means is disposed on an outer surface of one of the two side walls of the main body, and second connecting means is disposed on an outer surface of the other of the two side walls of the main body.

With the above structure, a plurality of tape cassette storage boxes can be sequentially connected, resulting in easy handling and storage of the plurality of tape cassette storage boxes. In particular, when microcassettes are used, the above structure is more convenient since the tape cassette storage box of this type tends to be lost due to its small size as compared with the tape cassette storage box for the compact cassette.

The tape cassette storage box of the invention may be so constructed that the tongue portion faces one of the relatively long side surfaces among the four side surfaces of the tape cassette when the cover is located in the first position.

Preferably, in the tape cassette storage box of this invention, the cover has rotation preventing members move with the cover and which prevent rotation of the reel hubs by engaging with the reel hubs of the tape cassette held in the main body when the cover pivots to the first position, and which disengages the tape cassette held in the main body from the reel hubs when the cover pivots to the second position.

With the above structure, the magnetic recording tape of the tape cassette is not slackened from the reel hub when the tape cassette storage box storing the tape cassette is carried, thus eliminating one of the factors relating to the problems of wow and flutter.

Preferably, in the tape cassette storage box of this invention, the cover, the tongue portion and the eject member are integrally formed.

With the above structure, the tape cassette storage box is simple in construction and a method for manufacturing the tape cassette storage box may be made correspondingly simple.

Preferably, in the tape cassette storage box of this invention, the eject member is in contact with the main body when the cover is located in the first position.

With the above structure, the rigidity of the tape cassette storage box is increased when the cover is located in the first position. Further, the tape cassette storage box may not be broken by an external force.

The above embodiments are only illustrative for the present invention and do not limit the present invention. Modifications and changes may be made within the scope and spirit of the present invention.

Figure 9:
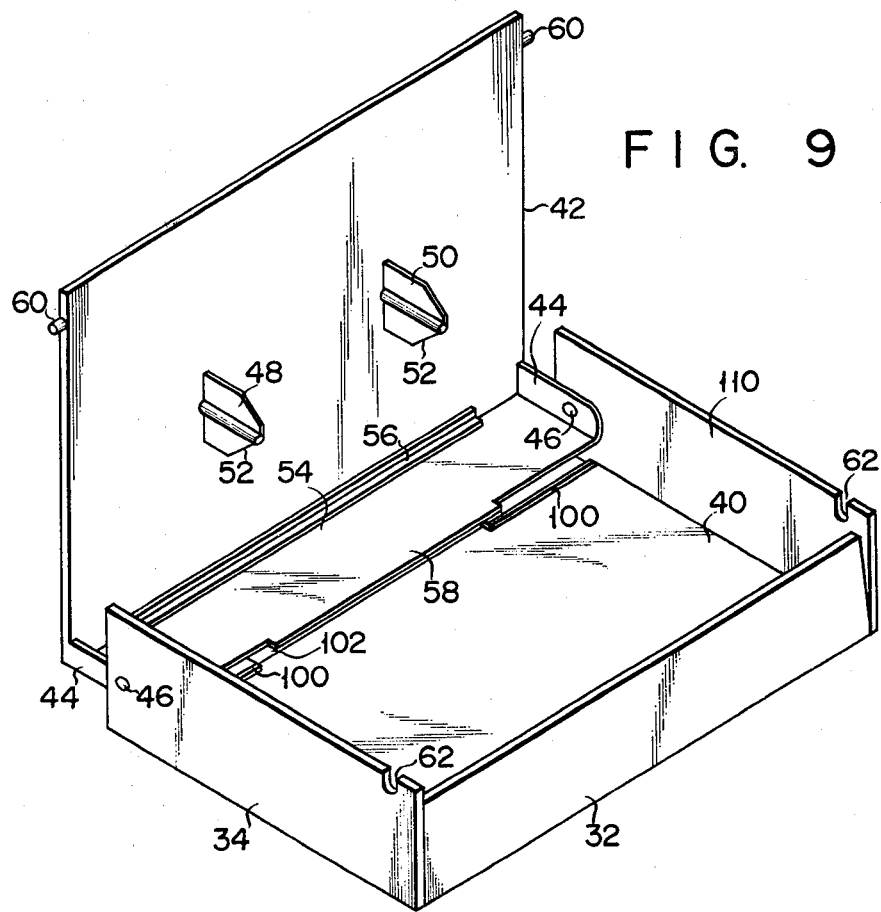
FIG. 9 is a perspective view of a modification of the embodiment of the present invention.

As shown in FIG. 9, for example, the tongue portion may face one of the relatively long side surfaces among the four surfaces of the tape cassette when the cover is located in the first position. In such a modification, the first side wall 30 may be eliminated. Instead, a side wall 110 which opposes the third side wall 34 is formed. Further, the first side wall 30 is eliminated and an opening defined thereby is used as the auxiliary opening.

What is claimed is:

1. A tape cassette storage box comprising a main body which has a tape cassette detachable opening and an auxiliary opening, said tape cassette detachable opening detachably holding a tape cassette which has two flat surfaces which are mutually spaced apart parallel to each other and rotatably holding reel hubs, and four side surfaces which connect said two flat surfaces and which extend along rims of said two flat surfaces, one of said two flat surfaces being exposed to the outer atmosphere, and said auxiliary opening exposing one of said four side surfaces of said tape cassette held in said main body to the outer atmosphere;

a cover which is rotatably mounted on said main body and is rotatable between a first position where said cover covers said tape cassette detachable opening and stores said tape cassette in said main body in cooperation therewith and a second position where said cover is spaced apart from said tape cassette detachable opening to allow mounting- /demounting of said tape cassette in and from said main body through said tape cassette detachable opening;

a tongue portion which moves together with said cover, which covers said auxiliary opening and which faces said one of said four side surfaces of said tape cassette which is held in said main body, when said cover is located in the first position, and an end portion of which, being away from said cover, comes close to said one of said four side surfaces of said tape cassette which is held in said main body when said cover is moved from the first position to the second position; and an eject member which is mounted on said tongue portion and which moves together with said tongue portion and is spaced apart from said tape cassette held in said main body upon the movement of said cover to the first position and which causes a part, in the vicinity of said one of said four side surfaces, of said one of said two flat surfaces of said tape cassette, to move in the direction away from said tape cassette detachable opening upon the movement of said cover from the first position to the second position.

2. A tape cassette storage box according to claim 1, wherein said eject member contacts with the other of said flat surfaces in the vicinity of said one of said four side surfaces of said tape cassette upon the movement of said cover from the first position to the second position.

3. A tape cassette storage box according to claim 1, wherein said tongue portion faces one of relatively short side surfaces among said four side surfaces of said tape cassette when said cover is located in the first position.

4. A tape cassette storage box according to claim 3, wherein said main body has two side walls which oppose relatively long side surfaces among said four side surfaces of said tape cassette held in said main box, first engaging means is disposed on an outer surface of one of said two side walls of said main body, and second connecting means is disposed on an outer surface of the other of said two side walls of said main body.

5. A tape cassette storage box according to claim 1, wherein said tongue portion faces one of relatively long side surfaces among said four side surfaces of said tape cassette when said cover is located in the first position.

6. A tape cassette storage box according to any one of claims 1 to 5, wherein said cover has rotation preventing members which move with said cover and which prevent rotation of said reel hubs by engaging with said reel hubs of said tape cassette held in said main body when said cover pivots to the first position, and which disengages said tape cassette held in said main body from said reel hubs when said cover pivots to the second position.

7. A tape cassette storage box according to any one of claims 1 to 5, wherein said cover, said tongue portion and said eject member are integrally formed.

8. A tape cassette storage box according to any one of claims 1 to 5, wherein said eject member contacts with said main body when said cover is located in the first position.

* * * * *